United States Patent [19]

Aoki et al.

[11] Patent Number: 4,954,262

[45] Date of Patent: Sep. 4, 1990

[54] METHOD AND APPARATUS FOR RECOVERING SULFURIC ACID FROM A TITANIUM SULFATE WASTE LIQUOR

[75] Inventors: Yoshiharu Aoki; Toshikatsu Hamano, both of Chiba, Japan

[73] Assignee: Asahi Glass Company Ltd., Tokyo, Japan

[21] Appl. No.: 429,379

[22] Filed: Oct. 31, 1989

[30] Foreign Application Priority Data

Nov. 8, 1988 [JP] Japan ................................. 63-280412
Dec. 6, 1988 [JP] Japan ................................. 63-306977
Dec. 22, 1988 [JP] Japan ................................. 63-321916

[51] Int. Cl.$^5$ ............................................. B01D 61/32
[52] U.S. Cl. ..................................... 210/638; 210/651
[58] Field of Search ............... 210/634, 637, 638, 644, 210/649, 650, 651–654

[56] References Cited

U.S. PATENT DOCUMENTS 4,111,866 9/1978 Torikai et al. ................. 210/500.25

*Primary Examiner*—Frank Sever
*Attorney, Agent, or Firm*—Oblon, Spivak, McClelland, Maier & Neustadt

[57] ABSTRACT

A method for recovering sulfuric acid from a titanium sulfate waste liquor by diffusion dialysis in a diffusion dialytic cell provided with anion exchange membranes, which comprises subjecting the titanium sulfate waste liquor to precision filtration to remove a solid content having a particle size of at least 0.1 $\mu$m to a level of not more than 100 $\mu$g/l, and placing the filtered liquor to face water with an anion exchange membrane interposed therebetween so that sulfuric acid in the titanium sulfate waste liquor is recovered by diffusion dialysis.

12 Claims, 3 Drawing Sheets

CONCENTRATION (N) OF FREE ACID
IN THE DIALYZED WASTE LIQUOR

METHOD AND APPARATUS FOR RECOVERING SULFURIC ACID FROM A TITANIUM SULFATE WASTE LIQUOR

The present invention relates to a novel method for efficiently recovering sulfuric acid from a titanium sulfate waste liquor, and an apparatus useful for the method.

As a method for recovering sulfuric acid from a titanium sulfate waste liquor discharged from the process for producing titanium dioxide by a sulfuric acid, diffusion dialysis employing anion exchange membranes has already been proposed. However, when such a method is practically put in operation, white solid particles start to precipitate on the surface of the ion exchange membranes immediately upon the starting of the operation, whereby the membrane performance will gradually deteriorate, and rupture of the membranes is likely to occur due to the precipitation of such particles in the membranes. Therefore, such a method has not been practically used for industrial operation.

Thus, it has been believed practically impossible to recover sulfuric acid from such a titanium sulfate waste liquor by means of ion exchange membranes. Yet, there has been no other effective method. Therefore, it has been obliged to dispose the waste liquor as a waste, in spite of the fact that it contains a titanium component and valuable substances such as sulfuric acid. Besides, with a view to preventing environmental pollution, the waste liquor is required to be neutralized with an alkali, and the costs for such treatment used to be substantial.

It is an object of the present invention to provide a novel method whereby sulfuric acid in such a titanium sulfate waste liquor can efficiently be recovered at low costs.

The following fact has been found by the research conducted by the present inventors, particularly from the analysis of the phenomenon that solid particles precipitate on the surface or inside of anion exchange membranes when the titanium sulfate waste liquor is subjected to diffusion dialysis by placing it to face water with the anion exchange membranes interposed therebetween. Namely, the particles attached to the anion exchange membranes are composed mainly of titanium dioxide. The titanium sulfate waste liquor contains titanium dioxide particles of various sizes. It has been found that among them, large particles, particularly particles of 0.1 $\mu$m or larger in a diameter, usually particles of 0.05 $\mu$m or larger, tend to adhere to the ion exchange membranes and cause the above-mentioned undesirable phenomenon. Titanium dioxide particles having a size smaller than the above may simply pass through the ion exchange membranes, or even when deposited on the ion exchange membranes, their contribution to the undesirable phenomenon has been found to be small or negligible.

From a further analysis of the phenomenon of the precipitation of particles on the surface or inside of the anion exchange membranes in the diffusion dialytic cell, it has been found that there is certain non-uniformity in the amounts of the attached particles of titanium dioxide on the surface of the anion exchange membranes, although the particles attached to the membranes are composed mainly of titanium dioxide, as mentioned above. Namely, the portion where the amount of attached particles is large is in the vicinity of the outlet of the dialytic cell where the removal of the acid from the titanium sulfate waste liquor is most advanced, in the case of the dialytic cell where the titanium sulfate waste liquor and water are supplied countercurrently. Further, in the vicinity of the outlet, the amount of titanium dioxide attached increases towards the interior of the dialytic cell.

From a further investigation of the amount of the precipitation of the titanium dioxide on such anion exchange membranes, it has been found that the amount of the attached titanium dioxide is very much related to the temperature of the dialytic cell. Namely, the temperature of the dialytic cell has been found to vary substantially since a substantial heat of dilution is generated when sulfuric acid in the titanium sulfate waste liquor is in contact with water via the anion exchange membranes, and the generated heat is stored in the interior of the dialytic cell thus causing a local temperature rise at a level of from 10 to 20° C.

Thus, the present inventors have studied the relation between the remaining acid concentration in the waste liquor and the precipitation temperature of titanium dioxide during the removal of acid by the diffusion dialysis of the titanium sulfate waste liquor, whereby the relation as shown in FIG. 1 in the attached drawings has been found to exist. As a result, it has been found it possible to efficiently recover sulfuric acid by controlling the precipitation of titanium dioxide by adjusting the temperature in the dialytic cell to a level lower than the predetermined level as shown in FIG. 1, in order to bring the remaining acid concentration in the titanium sulfate waste liquor to a desired predetermined concentration.

BRIEF DESCRIPTION OF DRAWINGS

In the accompanying drawings.

Thus, the present invention provides a method for recovering sulfuric acid from a titanium sulfate waste liquor by diffusion dialysis in a diffusion dialytic cell provided with anion exchange membranes, which comprises subjecting the titanium sulfate waste liquor to precision filtration to remove a solid content having a particle size of at least 0.1 $\mu$m to a level of not more than 100 $\mu$g, and placing the filtered liquor to face water with an anion exchange membrane interposed therebetween so that sulfuric acid in the titanium sulfate waste liquor is recovered by diffusion dialysis.

Now, the present invention will be described in detail with reference to the preferred embodiments.

In the present invention, the main component constituting the solid content in the titanium sulfate waste liquor is titanium dioxide. However, as minor components, iron oxide ($Fe_2O_3$), aluminum oxide ($Al_2O_3$), etc. are contained. Further, other solid impurities which are insoluble in the sulfate waste liquor are present. Among these solid contents, particles having particle sizes of at least 0.1 μm, preferably at least 0.05 μm, are removed by a precision filter preferably to a concentration of not higher than 100 μg/l, more preferably not higher than 50 μg/l. The precision filter to be used for this purpose may preferably be a hollow fiber or spiral type ultrafilter, a millipore filter, a microporous filter having a filtering surface having a pore diameter of not larger than 0.1 μm to 0.05 μm depending upon the size of particles to be removed, as well as a leaf filter wherein a filtering aid such as active carbon or u-cellulose is employed, or a cartridge filter.

Figure 2:
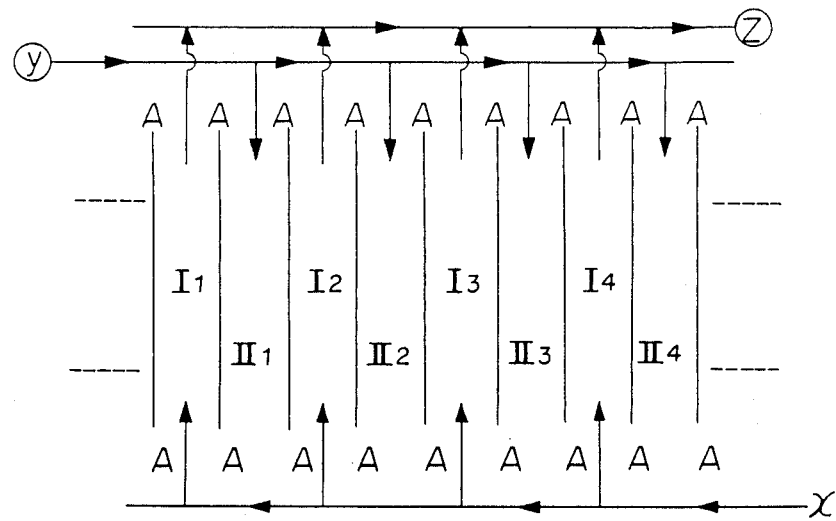
FIG. 2 illustrates the principle of the diffusion dialysis used for the method of the present invention.

The waste liquor from which the solid content having a particle size of at least 0.1 μm has been removed from the titanium sulfate waste liquor, is then placed to face water via an anion exchange membrane, whereby sulfuric acid in the waste liquor is recovered from the water side. The principle of such a method is illustrated in FIG. 2, A indicates an anion exchange membrane. Anion exchange membranes are disposed as shown in the figure to form a plurality of partitioned compartments. As an apparatus having such a construction, various types may be used. However, it is particularly preferred to employ a so-called filter press type dialytic cell wherein a plurality of anion exchange membranes are disposed between clamping frames with opened center portions to form dialytic compartments by means of compartment frames having liquid supply and discharge mechanisms and spacers, and the entire assembly is clamped to form a cell (as disclosed in e.g. Japanese Examined Patent Publication No. 34119/1973 and Japanese Unexamined Patent Publication No. 141803/1981).

As the anion exchange membranes for the present invention, weakly basic to strongly basic anion exchange membranes can be used. Preferably, a styrene-divinylbenzene copolymer or a vinylpyridine-divinylbenzene copolymer having a base of a quaternary ammonium salt as ion exchange groups, may be used. Such anion exchange membranes preferably have an ion exchange capacity of from 2.0 to 5.0, particularly from 3.0 to 4.0, meq/g dry resin for efficient recovery of sulfuric acid.

Referring to FIG. 2, the titanium sulfate waste liquor $\bigotimes$ is supplied to alternate dialytic compartments $I_1$, $I_2$, $I_3$ and $I_4$, as shown in the figure, at a rate of from 0.5 to 2.0 l/hr·m², while water $\bigcirc\!\!\!Y$ is supplied to recovery compartments $II_1$, $II_2$, $II_3$ and $II_4$ adjacent to the respective dialytic compartments partitioned by anion exchange membranes, at substantially the same flow rate as the above titanium sulfate waste liquor. The titanium sulfate waste liquor and water are preferably supplied countercurrently rather than in a concurrent flow fashion, so that a substantial gradient in the concentration of sulfuric acid is always maintained with the anion exchange membranes disposed therebetween.

Thus, the titanium sulfate waste liquor and water will face each other as partitioned by the anion exchange membranes, whereby sulfuric acid in the titanium sulfate waste liquor will selectively and efficiently be transferred to the water side and recovered. The treated solution $\bigcirc\!\!\!Z$ having sulfuric acid removed by the dialysis, is then discharged out of the system. However, if necessary, the treated solution is returned again to $\bigotimes$, so that it is recycled until sulfuric acid is sufficiently separated. The waste liquor $\bigcirc\!\!\!Z$ having sulfuric acid finally removed, can be neutralized by a substantially smaller amount of alkali than the case where no treatment of the present invention is applied, and then may be disposed. However, if necessary, the waste liquor may be used for other purposes. On the other hand, recovered sulfuric acid may be withdrawn from the system as it is, or if necessary, after returning to $\bigcirc\!\!\!Y$ recycling so that the sulfuric acid concentration reaches a predetermined concentration before withdrawal. Such sulfuric acid is pure and can be used as sulfuric acid for other purposes. However, it is preferably reused in the titanium production step from which it was originated.

In the present invention, when the dialytic cell is operated under control of the temperature to a level lower than the prescribed temperature as mentioned above, such an operation is conducted in the following manner. Namely, in the present invention, the operation is conducted by maintaining the temperature of the diffusion dialytic cell at a level lower than the temperature corresponding to the desired remaining acid concentration in the titanium sulfate waste liquor in accordance with FIG. 1 of the attached drawings.

In the present invention, if, for example, 80% of sulfuric acid in the feed waste liquor at a sulfuric acid concentration of from 4 to 8N is to be recovered at the remaining sulfuric acid concentration in the titanium sulfate waste liquor of 1.0N, it is necessary to maintain the temperature of the dialytic cell at a level of not higher than 15° C. Further, if 60% of sulfuric acid is to be recovered at the sulfuric acid concentration in the titanium sulfate waste liquor of 2.0N, it is necessary to maintain the temperature of the dialytic cell at a level of not higher than 30° C.

In the present invention, the temperature of the dialytic cell can be represented by either the temperature of the titanium sulfate waste liquor in the feed liquor compartment or the temperature of water in the recovery compartment, since the heat exchange in the inside of the dialytic cell is naturally sufficiently conducted through the ion exchange membranes.

In the present invention, the following dialytic cell is preferably employed to control the temperature of the dialytic cell to a level lower than the above-mentioned prescribed temperature. Namely, in the above-mentioned dialytic cell, a cooling compartment defined by water-impermeable membranes is provided adjacent to the above-mentioned feed liquor compartments or recovery compartments. The water-impermeable membrane is preferably a film having preferably a water absorptivity (ASTM D-570, 24 hours) of not higher than 0.1% and having preferably a thickness of from 50 to 300 μm. The size of the film may be the same as the size of the ion exchange membranes. Eventually, the cooling compartment preferably has the same thickness and size as the feed liquor compartment or recovery compartment.

Figure 3:
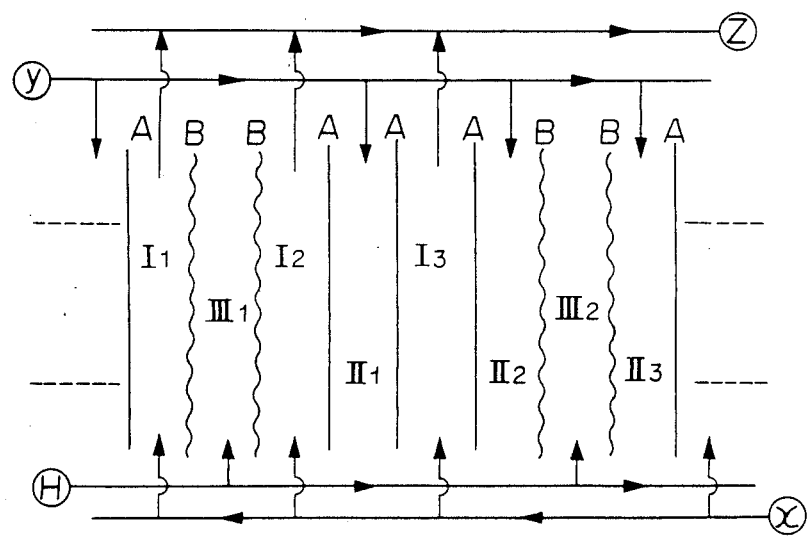
FIG. 3 illustrates the construction of a diffusion dialytic cell whereby the diffusion dialysis is conducted by controlling the temperature according to the present invention.

FIG. 3 illustrates the arrangement of the membranes of a diffusion dialytic cell having cooling compartments, constructed as described above. In FIG. 3, the same symbols as used in FIG. 2 indicate the same members. In FIG. 3, reference numerals $III_1$ and $III_2$ indicate cooling compartments defined by water-impermeable membranes B. The cooling compartment may be adjacent to the feed liquor compartments $I_1$ and $I_2$ as shown by $III_1$, or may be adjacent to the recovery compartments $II_2$ and $II_3$ as shown by $III_2$. Into the cooling compartments, a cooling medium $\bigcirc\!\!\!H$ such as purified water or city water is supplied. The cooling medium is preferably lower by from 2 to 10° C than the desired temperature, although such may vary depending upon the desired temperature of the dialytic cell.

The number of cooling compartments in a dialytic cell varies depending upon the temperature of the dialytic cell to be controlled. However, it is usually preferably from 0.5 to 0.02 unit per unit number of the feed liquor compartment or recovery compartment. The cooling compartments may not necessarily be provided with regular intervals or distances. However, in order to maintain the entire dialytic cell at a uniform temperature, they are preferably provided with predetermined intervals or distances.

There is no particular restriction as to the material for the water-impermeable membrane forming the cooling compartment. However, from the viewpoint of the corrosion resistance and costs, polyvinyl chloride, polyethylene or polypropylene is preferably employed. The cooling compartment may not necessarily be defined by water-impermeable membranes at both sides, and only one side may be defined by the water-permeable membrane. However, in order to avoid the mixing with the dialytic feed liquor or with the recovered solution, it is preferred that both sides are defined by the water-permeable membranes.

Figure 4:
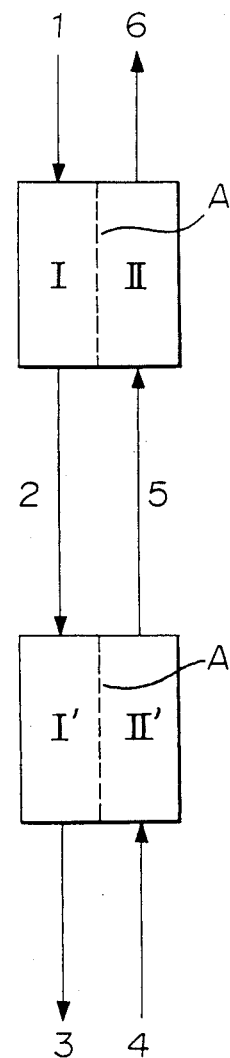
FIG. 4 is a diagrammatic view illustrating the method of the present invention which is conducted by means of a diffusion dialytic cell of a two stage type.

In the present invention, a plurality of the above-mentioned diffusion dialytic cells may be used. For example, depending upon the free acid concentration and titanium concentration in the titanium sulfate waste liquor, treatment can be conducted by a multistage diffusion dialytic cell, preferably of a type having 2 to 3 stages. FIG. 4 illustrates an embodiment wherein the titanium sulfate waste liquor is treated by a diffusion dialytic cell of a two stage type. In FIG. 4, the same symbols as used in FIG. 3 indicate the same membranes. In FIG. 4, the titanium sulfate waste liquor 1 is supplied to a dialytic compartment I of the first stage diffusion dialytic cell, and the dialyzed waste liquor 2 is then supplied to the dialytic compartment I' of the second stage diffusion dialytic cell for diffusion dialysis and after reaching to the predetermined concentration, discharged as the treated solution 3 out of the system. On the other hand, water 4 to be used for the acid recovery, is supplied to a recovery compartment II' of the second stage diffusion dialytic cell, and the recovered solution 5 in the second stage diffusion dialytic cell is supplied to a recovery compartment II of the first stage, and withdrawn as sulfuric acid 6. The titanium sulfate waste liquor and water may be supplied to the diffusion dialytic cells at proper flow rates. Namely, the waste liquor and water are supplied preferably from 5 to 0.3 l/m²·hr, more preferably at a rate of from 2 to 0.5 l/m²·hr. In such a case, it is of course possible to differentiate the supply rates as between the first stage and the second stage.

When the titanium sulfate waste liquor is treated in such multistage diffusion dialytic cells, it is possible to differentiate the recovery rate of sulfuric acid among the respective diffusion dialytic cells. The operation is preferably conducted so that precipitation of particles of titanium oxide on the ion exchange membranes takes place only in the diffusion dialytic cell of the final stage. For example, when diffusion dialytic cells of two stages are employed, it is preferred that the sulfuric acid concentration in the titanium sulfate waste liquor discharged from the diffusion dialytic cell of the first stage is from 100 to 200 g/l, while the sulfuric acid concentration in the waste liquor discharged from the dialytic compartment of the diffusion dialytic cell of the second stage is from 50 to 100 g/l. On the other hand, when diffusion dialytic cells of two stages are employed, the recovered acid concentration in the recovery compartments of the diffusion dialytic cells are preferably adjusted so that the concentration of the recovered acid discharged from the recovery compartment (II') of the second stage is from 100 to 200 g/l, while the concentration of the recovered acid discharged from the recovery compartment (II) of the first stage is from 200 to 400 g/l.

In the present invention, it is preferred to periodically treat the anion exchange membranes disposed in the dialytic cell with an aqueous solution containing a bactericide, whereby sulfuric acid can be recovered efficiently for a long period of time. The reason why the dialytic efficiency can be maintained by such treatment is considered to be such that microorganisms such as bacteria are thereby killed and anion exchange groups such as amino groups of the anion exchange membranes will no longer be destroyed by such microorganisms. As the bactericide, it is preferred to employ an aqueous formalin solution containing from 0.02 to 20% by weight of formaldehyde. The anion exchange membranes may be treated either by immersing them in such an aqueous solution, or by spraying such an aqueous solution to the membranes.

The titanium sulfate waste liquor to be treated by the present invention is the one discharged from the process for producting titanium by a sulfuric acid method. The waste liquor usually contains from 5 to 20 g/l of a titanium component (as $TiO_2$, the majority is dissolved in the form of $TiO\text{-}SO_4$) and from 200 to 400 g/l of sulfuric acid. According to the present invention, up to 90% of sulfuric acid in such a titanium sulfate waste liquor can be recovered as pure sulfuric acid (concentration: 200 to 400 g/l) for the first time on an industrial scale. Therefore, the method of the present invention is extremely useful.

Now, the present invention will be described in further detail with reference to Examples. However, it should be understood that the present invention is by no means restricted by such specific Examples.

EXAMPLE 1

Figure 1:
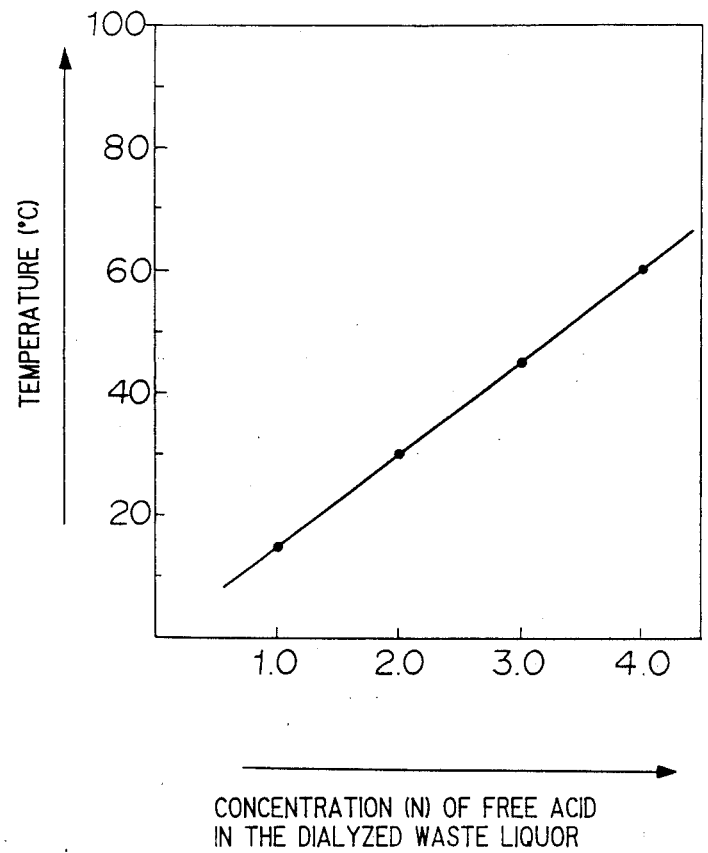
FIG. 1 is a graph showing the relation between the temperature of a diffusion dialytic cell and the remaining acid concentration in the titanium sulfate waste liquor when the titanium sulfate waste liquor is subjected to diffusion dialysis for the removal of acid.

A titanium sulfate waste liquor ($H_2SO_4$:300 g/l, $TiO_2$:10 g/l) discharged from the process for the production of titanium oxide, was subjected to filtration by means of a hollow fiber type precision filter having a filtrating surface with a pore diameter of 0.1 μm to remove the solid content in the waste liquor to a level of 50 μm/l. Such a waste liquor was subjected to diffusion dialysis by means of a filter press type diffusion dialytic cell (T-0b model, manufactured by Asahi Glass Company Ltd.) having the construction as shown in FIG. 1, whereby sulfuric acid was recovered.

The filtering area of the above filter was 0.01 m², and the filtration rate was 0.2 l/hr. The diffusion dialytic cell had ten sheets of anion exchange membrane made of a strongly basic styrene-divinylbenzene copolymer having an ion exchange capacity of 3.5 meq/g, and the membrane surface area of the ion exchange membranes was 0.2 m². To the diffusion dialytic cell, the titanium sulfate waste liquor and water were supplied countercurrently at a rate of 0.2 l/hr, and sulfuric acid was recovered. The sulfuric acid concentration in the recovered solution was 220 g/l, and $TiO_2$ was 0.05 g/l and the flow rate was 0.2 l/hr. The recovery rate was as high as 80%. The supply temperatures of the feed liquor and water were maintained below 10° C. to control the temperature in the dialytic cell not to exceed 20° C.

Under the above condition, a continuous operation was conducted for 90 days, whereby the change with time of the recovery performance was measured. As a result, substantially the same performance was maintained for 90 days.

COMPARATIVE EXAMPLE 1

A continuous test was conducted in the same manner as in Example 1 except that the filter was changed to a usual cartridge filter capable of removing a solid content of more than 1 μm in a pore diameter.

As a result, the sulfuric acid concentration in the recovered solution gradually decreased, and three days later, it decreased to a level of 100 g/l. To ascertain the cause, the diffusion dialytic cell was disassembled, whereby it was found that $TiO_2$ precipitated on the ion exchange membrane surface and such precipitation was the cause of the decrease.

EXAMPLE 2

A titanium sulfate waste liquor ($H_2SO_4$:260 g/l, Ti: 5 g/l) from the process for the production of titanium oxide by a sulfuric acid method, was introduced to a dialytic compartment of the first stage diffusion dialytic cell having a membrane surface area of 2,347 m$^2$ as shown in FIG. 2, at a flow rate of 1 m$^3$/hr and then introduced to a dialytic compartment of the second stage diffusion dialytic cell having membrane surface area of 705 m$^2$.

On the other hand, water was supplied to a recovery compartment of the second stage diffusion dialytic cell at a flow rate of 1 m$^3$/hr, and the solution from the outlet was supplied to a recovery compartment of the first stage diffusion dialytic cell.

As a result, the recovered acid containing 220 g/l of $H_2SO_4$ and 0.02 g/l of Ti was obtained at a flow rate of 0.944 m$^3$/hr, and the recovery rate was as high as 80%.

Under the same operational condition, a continuous operation was conducted, whereby the recovered acid concentration in the second stage gradually decreased. Then, the membranes of the second stage were washed with a 3% hydrofluoric acid aqueous solution, whereupon the recovered acid concentration was returned to the initial level. The decrease of the performance was observed every about 10 days. Therefore, only the second stage diffusion dialytic cell having a membrane surface area of 705 m$^2$ was washed every 10 days. After the operation for about 3 months, the dialytic cells were disassembled and the ion exchange membrane surfaces were inspected, whereby no abnormality was observed.

EXAMPLE 3

A titanium sulfate waste liquor ($H_2SO_4$:291 g/l, Ti: 5 g/l) from the process for the production of titanium oxide by a sulfuric acid method, was introduced from below to the feed liquor compartment of the diffusion dialytic cell as shown in FIG. 3 at a flow rate of 1,162 l/hr, while water was introduced from above to the recovery compartment of the diffusion dialytic cell at a flow rate of 960 l/hr.

In the diffusion dialytic cell, 880 sheets of anion exchange membrane (a strongly basic styrene-divinylbenzene copolymer) and 352 sheets of polyvinylchloride (water absorptivity: less than 0.1%, thickness: 200 μm) were incorporated, and cooling compartments were regularly disposed so that the cooling compartments were 0.4 compartment per unit number of the feed liquor compartment (or the recovery compartment).

On the other hand, cool water at a temperature of 25° C. was supplied from below to the cooling compartments at a rate of 3,500 l/hr.

As a result, 247 g/l of sulfuric acid was obtained as a recovered acid at a rate of 882 l/hr, and the recovery rate reached 71%. The temperature of the dialytic cell at that time was 25° C. at the upper portion of the recovery compartment and 23° C at the center portion. A continuous operation was conducted for about one month, whereupon the dialytic performance was stable, and the dialytic cell was disassembled to inspect the ion exchange membranes, whereby no abnormality was observed.

COMPARATIVE EXAMPLE 2

Diffusion dialysis was conducted under the same condition as in Example 3 except that the supply of cooling water to the cooling compartments was stopped, whereby at the initial stage of the operation 276 g/l of sulfuric acid was obtained as the recovered acid at a rate of 882 l/hr, and the recovery rate reached 72%.

However, when the operation was continued, the performance decreased gradually. Upon expiration of about one month, the acid concentration decreased to a level of 230 g/l, and the recovery rate also decreased to a level of 60%. At that time, the temperature of the dialytic cell was at a level of from 25 to 26° C at the upper and lower portions, but as high as 40° C at the central portion, thus clearly indicating the heat accumulation. The ion exchange membranes were inspected, whereby precipitation of titanium dioxide was observed in a strip shape with a width of about 20 cm at the ⅓ portion of the upper membrane portion on the side facing the feed liquor compartment, and this precipitation was found to be the cause for the deterioration of the performance.

What is claimed is:

1. A method for recovering sulfuric acid from a titanium sulfate waste liquor by diffusion dialysis in a diffusion dialytic cell provided with anion exchange membrane, which comprises;

subjecting the titanium sulfate waste liquor to precision filtration to remove a solids content having a particle size of at least 0.1 μm to a level of not more than 100 μg/l; and placing the filtered liquor to face water with an anion exchange membrane interposed therebetween so that sulfuric acid in the titanium sulfate waste liquor is recovered by diffusion dialysis at a temperature sufficiently low to substantially preclude adherence of titanium oxide particles to said membrane.

2. The method according to claim 1, wherein the titanium sulfate waste liquor and water are supplied in a flow ratio by volume of from 2/1 to 0.5/1.

3. The method according to claim 1, wherein the precision filtration is conducted by a precision filter having a porous filtering surface having a pore diameter of not more than 0.1 μm.

4. The method according to claim 3, wherein the precision filter is a hollow fiber or spiral type ultrafilter, a millipore filter or a porous tube filter.

5. The method according to claim 1, wherein the titanium sulfate waste liquor is placed to face water in a multistage diffusion dialytic cell provided with anion exchange membranes, and the titanium sulfate waste liquor is supplied from the first stage to the last stage of the multistage diffusion dialytic cell, while water is supplied countercurrently from the last stage to the first stage.

6. The method according to claim 5, wherein the multistage diffusion dialytic cell has two stages, and the recovery ratio of sulfuric acid of the first stage to the second stage is from 0.3 to 3.0.

7. The method according to claim 1, wherein the anion exchange membranes are periodically treated by an aqueous solution containing a bactericide.

8. The method according to claim 7, wherein the aqueous solution containing a bactericide is an aqueous formalin solution containing from 0.01 to 20% by weight of formaldehyde.

9. The method according to claim 1, wherein the temperature of the diffusion dialytic cell is lowered to a temperature lower than the temperature corresponding to the desired remaining acid concentration in the titanium sulfate waste liquor as defined in attached FIG. 1.

10. The method according to claim 9, wherein the temperature of the diffusion dialytic cell is maintained at a level of not higher than 30° C, and the concentration of free sulfuric acid in the titanium sulfate waste liquor is reduced to a level of not higher than 2.0N.

11. The method according to claim 1, wherein the anion exchange membranes have an ion exchange capacity of from 2 to 5 meq/g dry resin.

12. The method according to claim 1, wherein the titanium sulfate waste liquor is a waste liquor from a process for producing titanium oxide by a sulfuric acid method, which contains titanium dioxide as a solid content.

* * * * *